Patented Jan. 11, 1927.

1,614,036

UNITED STATES PATENT OFFICE.

ADOLF KÄMPF, OF PREMNITZ, GERMANY.

PROCESS FOR PRECIPITATING ARTIFICIAL THREADS, RIBBONS, FILMS, AND THE LIKE OF VISCOSE.

No Drawing. Application filed January 27, 1926, Serial No. 84,174, and in Germany August 6, 1921.

The present invention relates to the manufacture of artificial threads, ribbons, films and the like, and more particularly to products of such character made from viscose. The present application is a continuation in part of a copending application Serial No. 579,301, filed August 2, 1922.

The chief object of the invention is to provide a new and improved spinning bath for use in such manufacture. Other and further objects will be explained hereinafter and will be pointed out in the appended claims.

It is now well known that wood and other cellulose-containing substances may be disintegrated by means of phenols to produce a sulphonated resinous condensation product of the wood and the phenol. A description of the method may be found, for example, in German Patent No. 247,181 to Mauthner. The following steps have been found very serviceable: 100 to 150 kilograms melted phenol and 3 kilograms concentrated sulphuric acid (preferably about 96%) are mixed with 50 to 60 kilograms sawdust and heated for about ten minutes at a temperature of about 40 to 50 degrees. The sawdust should be dry, though it may contain about ten per cent moisture. During the heating, the mixture is slowly stirred. Various organic or inorganic acids or acid-forming substances, or substances of an aciduous or acidifying character may be used as catalyzers during the heating. A brownish-black, tar-like resinous product results which the heat renders very fluid. This product is stirred and 5 liters concentrated sulphuric acid is added. This acid may itself be the catalyzer. The temperature should be kept down to 100 or 105 degrees. At intervals of about four minutes, concentrated sulphuric acid is added in similar fashion in about five-liter quantities until a total quantity of about 198 liters has been added. After about an hour, an aqueous sulphuric-acid solution of the resinous, phenol-wood condensation product will be produced that is soluble in water. The wood may be more or less disintegrated, as desired.

According to the present invention, this sulphonated resin is concentrated to the desired degree, and then added to sulphuric acid in about the proportions of 10 to 12 per cent acid to about 5 per cent of the phenol-wood-sulphuric-acid reaction product. About 15 per cent sulphate of sodium is also contained. A very valuable spinning bath is thus produced. Under a normal drawing-off speed of 45 meters to the minute, the length of the bath may be about 50 centimeters. The temperature of the bath, using wholly unripe viscose, may be 18 degrees.

The resulting threads are of especially good physical structure, being very firm, with correspondingly valuable properties, including a beautiful lustre. The firmness is greater than that obtainable with prior-art salt baths, to which sulphuric acid is added. This is especially the case when the viscose used in wholly unripe, made from alkali cellulose that has not ripened completely, though good results are obtained also with fresh viscose from ripe alkali cellulose.

The condensation products produced as above described contain considerable quantieies of sulphuric acid. It may be used in this very condition, dissolved in water or dilute sulphuric acid, for spinning-bath purposes, and the resulting threads will be quite fine. If a coarser product, of the thickness of horsehair and the like, is desired, it is necessary to use a milder precipitating bath, containing as little free mineral acid as possible. During the manufacture of the condensation product, care must, in that event, be taken to avoid the occurrence of excess quantities of free mineral acid. This may be done by limiting the amount of concentrated sulphuric acid added to about 90 kilograms. The result will be a product containing little or no mineral acid. Such free sulphuric acid as still exists may be neutralized by adding alkalies, like caustic soda or sodium carbonate. Or, a proportionately weaker acid bath may be used, adding to the bath suitable proportions of salts of the mineral acid or of the resinous sulphuric acid in question to the same. The quantity of salts added will depend upon the purpose sought to be attained. Salts soluble in water may also be added to the sulphuric or mineral acids.

Soluble glue-precipitating sulphonic acids of mineral oils, soluble in water, aliphatic tars or tar oil, for instance, portions of so-called acid resin soluble in water, are particularly well suited for precipitating viscose solutions. These may be used with or without additions of acids or salts. As an illustration of a soluble, glue-precipitating sulphuric acid of a mineral oil, machine oil, of specific gravity 0.929, viscosity 5, Engler degrees at 50 degrees, flash point 182 degrees, and burning point 212 degrees is sulphonated at room temperature, in any well known way, with sulphonic acid monhydrate.

The precipitating bath, for instance, may contain, in addition to 10% sulphuric acid and 5-10% sodium sulphate, 6% lignite tar sulphonic acid. With this bath, and using viscose obtained without any artificial ripening, very solid fibres of high lustre are obtained.

Other aromatic sulphonic acids soluble in water that are able to precipitate the glue solution may also be used.

Among other substances suitable for this purpose are: aromatic sulphonic acids which precipitate glue, products of condensation of sulphonic acids with aldehydes or ketones, and products of condensation obtainable by heating homogeneous or mixed aromatic sulphonic acids, alone or together with substances having an affinity for water. For example, the bath may contain a soluble aromatic sulphonic acid adapted to precipitate a glue solution and a condensation product of sulphonic acid of naphthalene and formaldehyde. Reference may be made to British Patent No. 116,935 of 1918, and to German Patent No. 262,556 to Striasny, both of which disclose a glue-precipitating, aromatic sulphonic acid. Isopropyl sulphonic acid may be added. Another such condensation product is disclosed in German Patent No. 292,531. The most varied products may be used, irrespective of whether they be amorphous or crystalline by nature, and with or without hydroxyl, or whether they contain a single ring system in their molecule or several rings or ring systems connected together by groups of atoms. Acid salts and other substances which aid precipitation such as, for instance, even natural tanning substances, may be added to the precipitating bath. The so-called sulphonic acids may also be present, partially in salt form.

Thus the spinning bath may consist of 10% sulphuric acid, 7% of a sulphonic acid, and 10% sodium sulphate. The resulting viscose threads will be of the very greatest fineness. The temperature of the bath may be 20 degrees C., the dragging length about 40 cms. and the drawing-off speed 43 meters a minute. The threads have high lustre and solidity.

It is to be understood that the invention is not limited to the exact embodiments thereof disclosed herein, but that modifications may be made by persons skilled in the art without departing from its spirit and scope.

What is claimed is:

1. A method of producing artificial threads, films, ribbons and the like that comprises precipitating viscose in an aqueous solution of a sulphonic acid of the condensation product obtained by disintegrating a cellulose-containing substance by means of phenols.

2. A method of producing artificial threads, films, ribbons and the like that comprises precipitating viscose in an aqueous solution of a sulphonic acid of the condensation product obtained by disintegrating a cellulose-containing substance by means of phenols, the said aqueous solution containing a mineral salt.

3. A method of producing artificial threads, films, ribbons and the like that comprises precipitating viscose in an aqueous solution of a sulphonic acid of the condensation product obtained by disintegrating a cellulose-containing substance by means of phenols, the said aqueous solution containing a salt soluble in water.

4. A method of producing artificial threads, films, ribbons and the like that comprises precipitating unripened viscose in an aqueous solution of a sulphonic acid of the condensation product obtained by disintegrating a cellulose-containing substance by means of phenols, the said aqueous solution containing mineral salts and salts soluble in water.

5. A method of producing artificial threads, films, ribbons and the like that comprises precipitating viscose in an aqueous solution of a sulphonic acid of the condensation product obtained by disintegrating a cellulose-containing substance by means of phenols, the said aqueous solution containing a soluble glue-precipitating sulphonic acid of a mineral oil.

6. A method of producing artificial threads, films, ribbons and the like that comprises precipitating viscose in an aqueous solution of a sulphonic acid of the condensation product obtained by disintegrating a cellulose-containing substance by means of phenols, the said aqueous solution containing a soluble aromatic sulphonic acid adapted to precipitate a glue solution.

7. A method of producing artificial threads, films, ribbons and the like that comprises precipitating viscose in an aqueous solution of a sulphonic acid of the condensation product obtained by disintegrating a cellulose-containing substance by means of phenols, the said aqueous solution containing a soluble aromatic sulphonic acid adapted to precipitate a glue solution and a condensation product of sulphonic acid of naphthalene and formaldehyde.

8. A method of producing artificial threads, films, ribbons and the like that comprises precipitating viscose in an aqueous solution of a sulphonic acid of the condensation product obtained by disintegrating a cellulose-containing substance by means of phenols; the said aqueous solution containing a soluble glue-precipitating sulphonic acid of a mineral oil, aliphatic tar or tar oil, a soluble aromatic sulphonic acid adapted to precipitate a glue solution and a precipitating-furthering product.

In testimony whereof, I have hereunto subscribed my name.

Dr. ADOLF KÄMPF.